3,330,870
METHOD FOR PREPARING DIETHER SULFONES
David I. Randall and Charles Hung Chang, Easton, Pa., assignors to General Aniline & Film Corporation, New York, N.Y., a corporation of Delaware
No Drawing. Filed Sept. 29, 1964, Ser. No. 400,211
9 Claims. (Cl. 260—607)

The present invention relates, in general, to novel methods for the preparation of diether sulfones and, in particular, to novel methods for the preparation of diether of sulfonyldiethanol from diacyloxy ethyl sulfones.

Heretofore, diethers of sulfonyldiethanol such as bis-(2-alkoxyethyl) sulfone and bis-(2-aroxyethyl) sulfone were customarily prepared from starting materials such as divinylsulfone, bis-(2-chloroethyl) sulfone or vinyl-2-chloroethyl sulfone. However, as is known, methods based on bis-(2-chloroethyl) sulfone, divinylsulfone and vinyl 2-chloroethyl sulfone involve the use of starting materials which are highly toxic and known skin irritants. Methods for producing diethers of sulfonyldiethanol based on oxidization of the corresponding sulfides or sulfoxides are unsuitable because of their complexity.

Accordingly, it is an object of the present invention to provide novel methods for the preparation of diethers of sulfonyldiethanol which are independent of toxic starting materials.

Another object of this invention resides in the provision of novel methods for the preparation of diethers of sulfonyldiethanol which are characterized by economically feasible reaction times and substantially high yields.

Yet other objects and advantages attendant the invention will become further apparent hereinafter as the description thereof proceeds.

One or more of the above objects are readily attained by methods which comprise reacting a bis(acyloxyethyl) sulfone wherein the acyl radical is that of a carboxylic acid, preferably bis-(2-acetoxyethyl) sulfone and a member of the group consisting of alcohols and phenols in the presence of a base for a period of time sufficient to produce a diether of sulfonyldiethanol.

The reaction of the bis-(2-acyloxyethyl) sulfone and a member of the group consisting of alcohols and phenols can be conveniently illustrated by the following equation, with specific reference to ethanol as a matter of convenience:

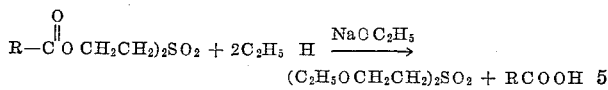

where R represents alkyl (usually lower alkyl of 1 to 4 carbon atoms although the process is operable when R is higher alkyl such as lauryl or stearyl), aryl (e.g. phenyl or naphthyl), alkaryl (e.g. benzyl) or heterocylic (e.g. pyridinyl and furfuryl).

While stoichiometric or equimolar proportions of the two reactants are required and preferred as illustrated above, an excess of either reactant can be employed if desired.

The reaction between the bis-(2-acyloxyethyl) sulfone and alcohol or phenol proceeds smoothly and quickly at ambient temperatures and above. The reaction is amenable to the application of heat and an elevated temperature in the range of from 50° C. to 100° C. is preferred.

While atmospheric pressures are preferred either subatmospheric or superatmospheric pressures can be employed if desired.

The bis-(2-acyloxyethyl) sulfones may be readily prepared by the reaction in conventional manner of sulfonyl diethanol and an acylative agent. Thus, bis-(2-acetoxyethyl) sulfone may be prepared by the reaction of sulfonyl diethanol with acetic anhydride, acetyl chloride or glacial acetic acid. Other bis-(2-acyloxyethyl) sulfones may be prepared by reaction of sulfonyl diethanol with other acids, or their chlorides or anhydrides, corresponding to the acyl group desired, for example, propionic, butyric, benzoic, phenylacetic, nicotinic or furoic acids and the like.

The alcohols and phenols which are amenable to the methods of the invention include methanol, ethanol, n-propanol, n-butanol, isopropanol, isobutanol, n-hexanol, pentanol-1, decanol-1, allyl alcohol, cinnamyl alcohol, 3-cyclohexenyl methanol, p-allyl phenol, p-crotyl phenol, dicrotyl phenol, phenol, cresol and the like.

The base employed in carrying out the reaction between bis-(2-acetoxyethyl) sulfone and the alcohol or phenol can be the alkali metal alkoxide of the alcohol employed in the alcoholysis reaction or simple base such as sodium or potassium hydroxide.

The amount of base employed in the reaction is not necessarily a critical feature of the invention but it has been observed that the reaction is fast and the yields are high when at least a molecular equivalent amount of base is employed.

In carrying out the methods of the invention a reaction flask is charged with an alcohol such as ethanol and metallic sodium to form the corresponding alkoxide whereupon the sulfone, preferably dissolved in the alcohol corresponding to the alkoxide, is added usually with stirring to assure thorough mixing. The temperature is maintained at about 50° C. to 60° C. After the sulfone addition is complete stirring is continued with or without further heating, as desired, for about 5–10 minutes. The product is then recovered by conventional procedures as by neutralizing the base, solvent removal, filtration of the product, washing and the like.

The following examples will serve to illustrate the practice of the invention.

Example 1

To a three-necked flask containing 500 ml. of methyl alcohol there was added, with cooling, 9.2 g. (0.4 mole) of sodium to form the corresponding alkoxide whereupon 95.2 g. (0.4 mole) of bis-(2-acetoxyethyl) sulfone dissolved in 200 ml. of methyl alcohol was then gradually added, keeping the reaction temperature at 50–60° C. with stirring. After the addition of acetoxysulfone the reaction mixture was then further stirred without external heating for 5 to 10 minutes. The basic solution was acidified with glacial acetic acid and the solvent alcohol was then removed under reduced pressure. The semi-solid residue was mixed with 200 ml. of dry ether filtered and washed several times with ether. The filtrate with the washings was then concentrated under reduced pressure to remove any ether and alcohol. The resulting residue was again mixed with 200 ml. of ether, filtered and washed with ether. The filtrate with washings was then evaporated and distilled in vacuo. There were recovered 58.0 g. of bis-(2-methoxyethyl) sulfone in a yield of 80.0 percent of theory having a boiling point of 110–112° C. (0.5 mm. Hg), a melting point of 35° C. and a refractive index, $N_D^{25}$ of 1.4607.

Example 2

To a three-necked flask containing 400 ml. of ethyl alcohol there was added, with cooling, 6.9 g. (0.3 mole) of sodium to form the corresponding alkoxide whereupon 71.4 g. (0.3 mole) of bis-(2-acetoxyethyl) sulfone dissolved in 200 ml. of ethyl alcohol was then gradually added, keeping the reaction temperature at 50–60° C. with stirring. After the addition of acetoxylsulfone the reaction mixture was then further stirred without external heating for 5 to 10 minutes. The basic solution was acidified with glacial acetic acid and the solvent alcohol was then removed under reduced pressure. The semi-solid residue was mixed with 200 ml. of dry ether filtered and washed several times with ether. The filtrate with the washings was then concentrated under reduced pressure to remove any ether and alcohol. The resulting residue was again mixed with 200 ml. of ether, filtered and washed with ether. The filtrate with washings was then evaporated and distilled in vacuo. There were recovered 57.0 g. of bis-(2-ethoxyethyl) sulfone in a yield of 90.5 percent of theory having a boiling point of 112–113° C. (0.4 mm. Hg) and a refractive index, $N_D^{25}$ of 1.4511.

*Example 3*

To a three-necked flask containing 450 ml. of n-butyl alcohol there was added, with cooling, 6.9 g. (0.3 mole) of sodium to form the corresponding alkoxide whereupon 71.4 grams (0.3 mole) of bis-(2-acetoxyethyl) sulfone dissolved in 200 ml. of n-butyl alcohol was then gradually added, keeping the reaction temperature at 50–60° C. with stirring. After the addition of acetoxylsulfone the reaction mixture was then further stirred without external heating for 5 to 10 minutes. The basic solution was acidified with glacial acetic acid and the solvent alcohol was then removed under reduced pressure. The semi-solid residue was mixed with 200 ml. of dry ether filtered and washed several times with ether. The filtrate with the washings was then concentrated under reduced pressure to remove any ether and alcohol. The resulting residue was again mixed with 200 ml. of ether, filtered and washed with ether. The filtrate with washings was then evaporated and distilled in vacuo. There were recovered 62.0 g. of bis-(2-n-butoxyethyl) sulfone in a yield of 77.7 percent of theory having a boiling point of 137–139° C. (0.1 mm. Hg) and a refractive index, $N_D^{25}$ of 1.4514.

*Example 4*

To a three-necked flask containing 12 g. (0.3 mole) of sodium hydroxide dissolved in 50 ml. of water was dissolved with heating on a steam bath 18.8 g. (0.2 mole) of phenol with stirring. Bis-(acetoxyethyl) sulfone, 23.8 g. (0.1 mole) was then added rapidly with stirring. After the addition of the acetoxy-sulfone, the reaction mixture was further stirred for 5 minutes with heating on a steam bath. The mixture was then diluted with 200 ml. of water, filtered and washed with water and ether to give 27 g. of dry bis-(2-phenoxyethyl) sulfone, M.P. 90–94° C. Crystallization from the mixture of acetic acid and water gave a pure sample, M.P. 106–108° C.

*Example 5*

The process of Example 1 was repeated except that 144.8 g. (0.4 mole) of bis-(2-benzoxyethyl) sulfone was used in place of 95.2 g. of bis-(2-acetoxyethyl) sulfone. Bis-(2-methoxyethyl) sulfone was recovered in good yield.

*Example 6*

The process of Example 4 was repeated except that 34.2 g. (0.1 mole) of bis-(2-furolyoxyethyl) sulfone was used in place of 23.8 g. of bis-(acetoxyethyl) sulfone. An acceptable yield of bis-(2-phenoxyethyl) sulfone was obtained.

While the invention has been described with specific reference to certain embodiments thereof, as illustrated in the specific examples, it is obvious that other equivalent materials, mentioned in the specification, can be utilized with equivalent results. Therefore, it is not intended that the invention be limited except as necessitated by the appended claims.

What is claimed is:

1. The method of producing diethers of sulfonyldiethanol of the formula $(ROCH_2CH_2)_2SO_2$ wherein R represents a hydrocarbon, which comprises reacting bis-(2-acyloxyethyl) sulfone wherein the acyl radical is that of a carboxylic acid and a hydroxy compound of the group consisting of alcohols and phenols, in the presence of a base from the group consisting of an alkali metal hydroxide and the alkali metal alkoxide of the hydroxy compound employed in the reaction.

2. The method according to claim 1 wherein the base is a sodium alkoxide.

3. The method according to claim 1 wherein the base is an alkali hydroxide.

4. The method of producing bis-(2-methoxyethyl) sulfone which comprises reacting bis-(2-acetoxyethyl) sulfone and methanol in the presence of sodium methoxide.

5. The method of producing bis-(2-ethoxyethyl) sulfone which comprises reacting bis-(2-acetoxyethyl) sulfone and ethanol in the presence of sodium ethoxide.

6. The method of producing bis-(2-n-butoxyethyl) sulfone which comprises reacting bis-(2-acetoxyethyl) sulfone and n-butanol in the presence of sodium n-butoxide.

7. The method of producing bis-(2-phenoxyethyl) sulfone which comprises reacting bis-(2-acetoxyethyl) sulfone and phenol in the presence of sodium hydroxide.

8. The method of producing diethers of sulfonyldiethanol of the formula $(ROCH_2CH_2)_2SO_2$ wherein R represents a hydrocarbon, which comprises reacting bis-(2-acyloxyethyl) sulfone wherein the acyl radical is that of carboxylic acid and a hydroxy compound of the group consisting of alcohols and phenols, in the presence of a base from the group consisting of an alkali metal hydroxide and the alkali metal alkoxide of the hydroxy compound employed in the reaction, for a period of time sufficient to produce said diethers, neutralizing said base and recovering the product thus produced.

9. The method of producing diethers of sulfonyl diethanol of the formula $$(ROCH_2CH_2)_2SO_2$$

wherein R represents a hydrocarbon which comprises reacting bis-(2-acetoxyethyl) sulfone and a hydroxy compound of the group consisting of alcohols and phenols in the presence of a base from the group consisting of an alkali metal hydroxide and the alkali metal alkoxide of the hydroxy compound employed in the reaction, for a period of time sufficient to produce said diethers, neutralizing said base and recovering the product thus produced.

No references cited.

CHARLES B. PARKER, *Primary Examiner.*

DELBERT R. PHILLIPS, *Assistant Examiner.*

UNITED STATES PATENT OFFICE
CERTIFICATE OF CORRECTION

Patent No. 3,330,870                                    July 11, 1967

David I. Randall et al.

It is hereby certified that error appears in the above numbered patent requiring correction and that the said Letters Patent should read as corrected below.

Column 1, lines 48 to 50, the left-hand formula should appear as shown below instead of as in the patent:

column 2, line 68, and column 3, line 20, for "acetoxylsulfone" read -- acetoxysulfone --; column 4, line 37, for "(2-acyloxethyl)" read -- (2-acyloxyethyl) --.

Signed and sealed this 18th day of June 1968.

(SEAL)
Attest:

EDWARD M. FLETCHER, JR.                          EDWARD J. BRENNER
Attesting Officer                                     Commissioner of Patents